United States Patent
Hinckley et al.

(10) Patent No.: US 7,173,637 B1
(45) Date of Patent: Feb. 6, 2007

(54) DISTANCE-BASED ACCELERATED SCROLLING

(75) Inventors: Kenneth Paul Hinckley, Redmond, WA (US); Edward B. Cutrell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 10/112,775

(22) Filed: Apr. 2, 2002

Related U.S. Application Data

(63) Continuation-in-part of application No. 09/791,900, filed on Feb. 26, 2001.

(51) Int. Cl.
*G09G 5/34* (2006.01)
(52) U.S. Cl. .................................................. 345/684
(58) Field of Classification Search ................ 345/684, 345/784, 785, 159; 715/784, 785
See application file for complete search history.

(56) References Cited

U.S. PATENT DOCUMENTS

| | | | |
|---|---|---|---|
| 5,179,648 A * | 1/1993 | Hauck | 345/684 |
| 5,495,566 A * | 2/1996 | Kwatinetz | 345/785 |
| 5,530,455 A | 6/1996 | Gillick | |
| 5,633,657 A | 5/1997 | Falcon | |
| 5,877,748 A | 3/1999 | Redlich | |
| 5,943,052 A | 8/1999 | Allen | |
| 6,075,533 A | 6/2000 | Chang | |
| 6,097,371 A | 8/2000 | Siddiqui | |
| 6,128,006 A | 10/2000 | Rosenberg | |
| 6,198,473 B1 | 3/2001 | Armstrong | |
| 6,259,432 B1 * | 7/2001 | Yamada et al. | 345/159 |
| 6,310,607 B1 | 10/2001 | Amemiya | |
| 6,424,338 B1 * | 7/2002 | Anderson | 345/173 |
| 6,587,093 B1 * | 7/2003 | Shaw et al. | 345/163 |
| 6,747,680 B1 * | 6/2004 | Igarashi et al. | 345/159 |
| 7,081,905 B1 * | 7/2006 | Raghunath | 345/684 |

OTHER PUBLICATIONS

Shumin Zhai and Paul Milgram, "Human Performance Evaluation of Manipulation Schemes in Virtual Environments," paper, Proc. IEEE Virtual Reality Annual International Symposium (VRAIS), Seattle, WA, Sep. 1993, Dept. of Industrial Engineering, Univ. of Toronto, Toronto, Canada M5S 1A4.

Andrew Sears, Catherine Plaisant, Ben Shneiderman, "A New Era for High Precision Touchscreens," paper, Human-Computer Interaction Laboratory & Department of Computer Science, University of Maryland, Jun. 1990, pp. 1-33.

Ken Hinckley, John C. Goble, Randy Pausch, Neal F. Kassell, "New Applications for the Touchscreen in 2D and 3D Medical Imaging Workstations," paper, Proc. SPIE Medical Imaging '95, University of Virginia, Charlottesville, VA 22903, 10 pp.

(Continued)

*Primary Examiner*—Jeffery A. Brier
(74) *Attorney, Agent, or Firm*—Banner & Witcoff, Ltd.

(57) ABSTRACT

A method and system for performing distance-based accelerated scrolling are described. The system accelerates scrolling based on the distance that a user has already scrolled, and continues to scroll in a quick manner. Using a conventional wheelmouse, consecutive quick flicks of the wheel may be used as an approximation of the distance that the user has scrolled, based on the effort the user expends flicking the wheel. The system inhibits acceleration when the user slows down or reverses direction in order to return fine scrolling capabilities to the user to locate an exact position in a data file.

11 Claims, 7 Drawing Sheets

OTHER PUBLICATIONS

Shumin Zhai, Barton A. Smith, Ted Selker, "Improving Browsing Performance: A study of four input devices for scrolling and pointing tasks," paper, Proceedings of INTERACT97: The Sixth IFIP Conference on Human-Computer Interaction, Sydney, Australia, Jul. 14-18, pp. 286-292.

Shumin Zhai, Ph.D., Human Performance in Six Degree of Freedom Input Control, thesis, Ergonomics in Teleoperation and Control Lab, Dept. of Industrial Engineering, University of Toronto, 1995, 227 pp.

George G. Robertson, Stuart K. Card, and Jock D. MacKinlay, The Cognitive Coprocessor Architecture for Interactive User Interfaces, paper, Xerox Palo Alto Research Center, 333 Coyote Hill Road, Palo Alto, CA 94304, 1989, pp. 10-18.

Herbert D. Jellinek and Stuart K. Card, "Powermice and User Performance", Xerox Palto Alto Research Center, CHI '90 Proceedings, Apr. 1990, pp. 213-220.

I. Scott MacKenzie, "Chapter 11: Input Devices and Interaction Techniques for Advanced Computing" in Virtual Environments and Advanced Interface Design, Woodrow Barfield and Thomas A. Furness III (Eds.), Oxford University Press, Oxford, UK, 1995, pp. 436-470.

Andrew Sears and Ben Shneiderman, "High precision touchscreens: design strategies and comparisons with a mouse", study, Int. J. Man-Machine Studies, 1991, 34, pp. 593-613, Dept. of Computer Science and Human-Computer Interaction Laboratory, University of Maryland, College Park, MD 20742.

* cited by examiner

DISTANCE-BASED ACCELERATED SCROLLING

CROSS-REFERENCE TO RELATED APPLICATIONS

The present application is a continuation-in-part of and claims priority from U.S. application Ser. No. 09/791,900, filed Feb. 26, 2001. The present application is related by subject matter to U.S. application Ser. No. 09/407,946, filed Sep. 29, 1999.

FIELD OF THE INVENTION

The invention relates generally to computer systems. More specifically, the invention relates to a non-linear gain control for accelerated scrolling on a computer display based on input received from a motion-sensing input device.

BACKGROUND OF THE INVENTION

The computer mouse has simplified the computer-human interface. Before the computer mouse, many users were confined to interacting with a computer through the use of a command line interface (CLI as is known in the art). The computer mouse (also commonly referred to simply as a "mouse") has, in recent years, been improved upon with the inclusion of a wheel on the top of the mouse. An example of a wheeled mouse is shown in FIGS. 1A and 1B. The function of the wheel 103 is to scroll the text or document or image located below a displayed cursor 116 shown on a visual display device 107. The wheel is linked to an optically encoded wheel for sensing the rotational location of the wheel 103. To allow for feedback to the user, the wheel contains a number of notches (not shown for simplicity). When rotated, a user is presented with tactile feedback of the distance rotated through sensing the number of notches rotated by the wheel. The function of the wheel 103 is interpreted through signals sent from mouse 102 through cable 104 to computer 100 having memory 150 and processor 110. Shown for completeness is keyboard 101, which is generally used in combination with mouse 102 for various operations as are known in the art. For example, rotating the wheel away from the user may scroll the underlying displayed content down so as to show another portion of the displayed content immediately preceding, or above, the originally displayed content. Likewise, rotating the wheel toward the user may scroll the underlying displayed content up so as to show another portion of the displayed content immediately subsequent to, or below, the originally displayed content.

A user may specify a scrolling mode of either scrolling by a fixed number of lines (referred to herein as the "line-scrolling mode") or scrolling by page (referred to herein as the "page-scrolling mode). To change from one scrolling mode, or to modify the number of lines to scroll in the line-scrolling mode, a user navigates a series of windows to a preferences option list for the wheeled mouse. In general, the preferences page allows selection of the scrolling mode as well as a designation of the number of lines to scroll per notch indent when a line-scrolling mode is selected.

Presently, to scroll a document or other content on a computer screen, a user may use a scrolling mechanism on an input device such as the wheel on a mouse as described above, keyboard navigation keys, or a scroll bar provided as part of a graphical user interface. In many scenarios, the wheel on the mouse is preferred for scrolling. Scrolling through a document via the wheel on a wheeled mouse provides useful document handling without the need to access the keyboard or predefined scroll bars. A mouse wheel is, however, limited in the distance that one can quickly scroll through a document or other data file. Rolling the wheel works very well for precision (short-distance) scrolling, allowing users to finely tune to the section of the page they want visible, but this method becomes less satisfactory as document length is increased and the user needs to scroll longer distances.

For example, in a scenario where the user needs to scroll a long distance in a document using a wheeled mouse as shown in FIGS. 1A and 1B, the user would have to scroll across 22 notches of the mouse wheel per page of 66 lines on the default setting of 3 lines per notch. In a typical stroke, the user may go through 6 notches; therefore to scroll one whole page the user has to actuate a full stroke of the wheel four times. Scrolling more than approximately two pages may make using the scroll wheel uncomfortable, strenuous, and time consuming.

As a document's size changes or the needs of a user change (for example, from drafting a document to editing or reviewing a completed draft), the user may desire to change the scrolling mode. With the known wheeled mouse, changing the scrolling mode involves navigating to a mouse preferences page, switching the scrolling mode, changing (when appropriate) the number of lines to scroll with every rotational notch in the wheel, and finally returning to the underlying document. Some users may find that these steps detract from the ease of using the scrolling feature of a wheeled mouse.

Input controls typically used for scrolling are often provided with a very low input resolution. For example, one existing mouse wheel has 18 notch positions that can be sensed, i.e., one notch per every 20 degrees. (Notches are provided for tactile feedback, and are not required. Notches merely provide the user tactile feedback to determine when the user has rolled through a position on the wheel that will trigger a wheel rotation signal. One can imagine a wheel that has no notches but works the same as stated above.) Furthermore, messages from the mouse are transmitted to the operating system at a predetermined reporting rate, e.g., 100 Hz for PS/2 and 30 Hz for serial (USB) mice. Thus, if considered as a sensor which ideally would detect the exact actual rotation imparted by the user's finger, the wheel mechanism actually suffers from significant quantization effects both for the sensed angle (20 degree increments) and the sensed time at which the wheel arrived at that angle. As a result, modification of the device's control-to-display ratio can have a significant effect on the user's performance.

The general concept of attempting to enhance user performance by setting an "optimal" control-to-display ratio (gain factor), or by providing a variable gain factor depending on the speed, distance, or other performance criteria of a human gesture, is known in the art. For example, on many desktop computers presently available, the distance which a mouse cursor moves on the screen in response to hand movement varies depending on the speed of the gesture. However, gain factor manipulation is not widely used for scrolling.

One known accelerated scrolling technique, implemented on Apple Macintosh computers, uses only two scroll modes. The technique apparently moves the screen in increments of one full page when the user rolls the wheel quickly, but moves a single line at a time when the user rolls the wheel slowly. In addition to its operational limitations, it is difficult to implement this technique on a Windows-based system because of the architecture of the Windows mouse system. Other known techniques for "accelerating" input device control/gain ratios in response to the user's input gesture do not give satisfactory results when scrolling a document using a wheel or other motion sensing input mechanism.

Accordingly, a more efficient technique for providing accelerated scrolling would be desirable, particularly one that could be optimized for motion sensing input devices using Microsoft WINDOWS® brand operating systems.

SUMMARY

Aspects of the invention overcome one or more problems described above by providing methods and systems for accelerating scrolling based on a distance that a user has scrolled and continues to scroll in an manner meeting predefined criteria. The invention allows a user to more quickly scroll an extended distance than previously known methods and systems, by gradually increasing from lower to higher acceleration.

An aspect of the invention approximates the distance that the user has already scrolled by tracking consecutive engagement-movement-disengagement cycles of an input device. Various aspects of the invention may accelerate scrolling based on input received from a wheelmouse, trackball, touchpad, wheel integrated keyboard, or similar input device that uses an engagment-movement-disengagement cycle to scroll long distances.

BRIEF DESCRIPTION OF THE DRAWINGS

The present invention is described with respect to the accompanying figures, in which like reference numerals identify like elements, and in which.

DETAILED DESCRIPTION OF THE INVENTION

To address the shortcomings of known scrolling devices as noted above, a non-linear gain control for accelerated scrolling using a mouse wheel or other user motion sensing input device that may be used for scrolling or data file navigation is disclosed. In a wheeled mouse scrolling implementation, in various aspects the system can adjust the control-to-display ratio between input and apparent motion on the screen based on the distance a user has scrolled.

Figure 1A:
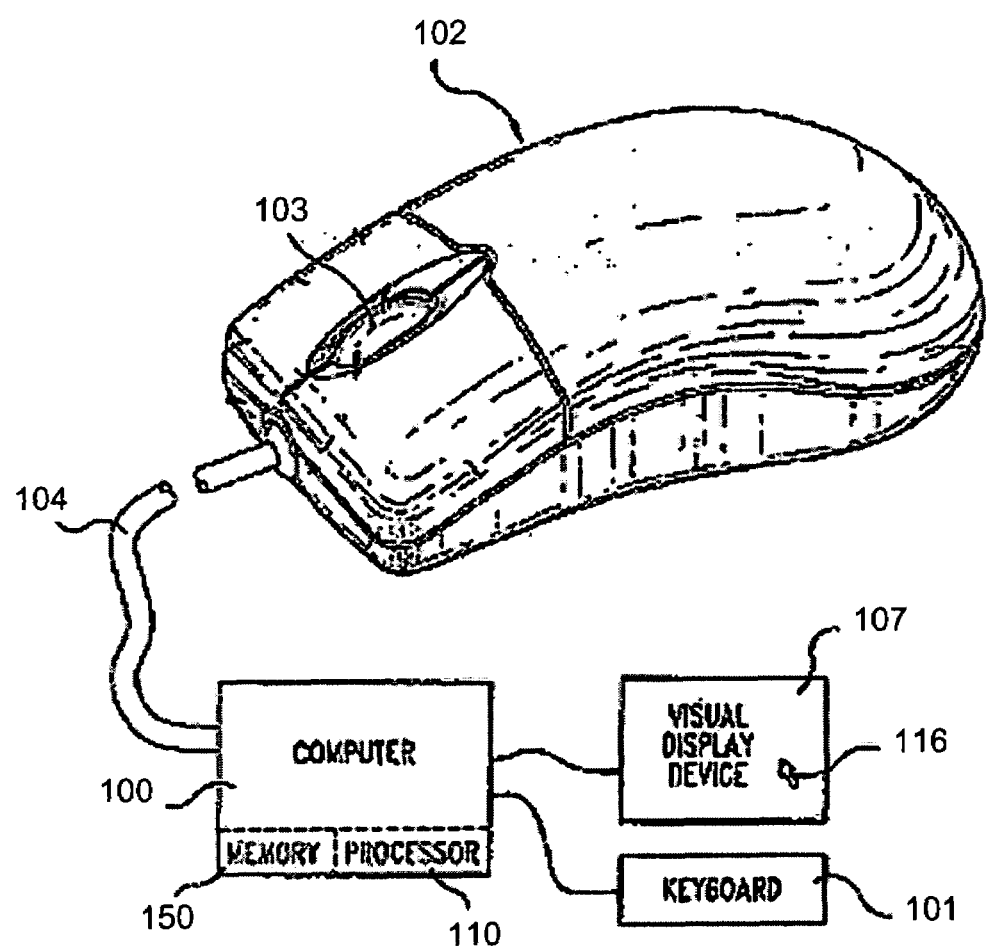
FIG. 1A illustrates a perspective view of a mouse having a wheel, together with a diagrammatic representation of associated computer system components.
Figure 1B:
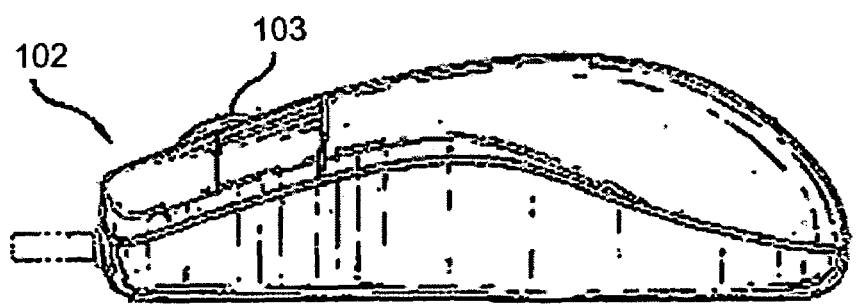
FIG. 1B illustrates a side elevational view of the mouse shown in FIG. 1A.
Figure 1C:
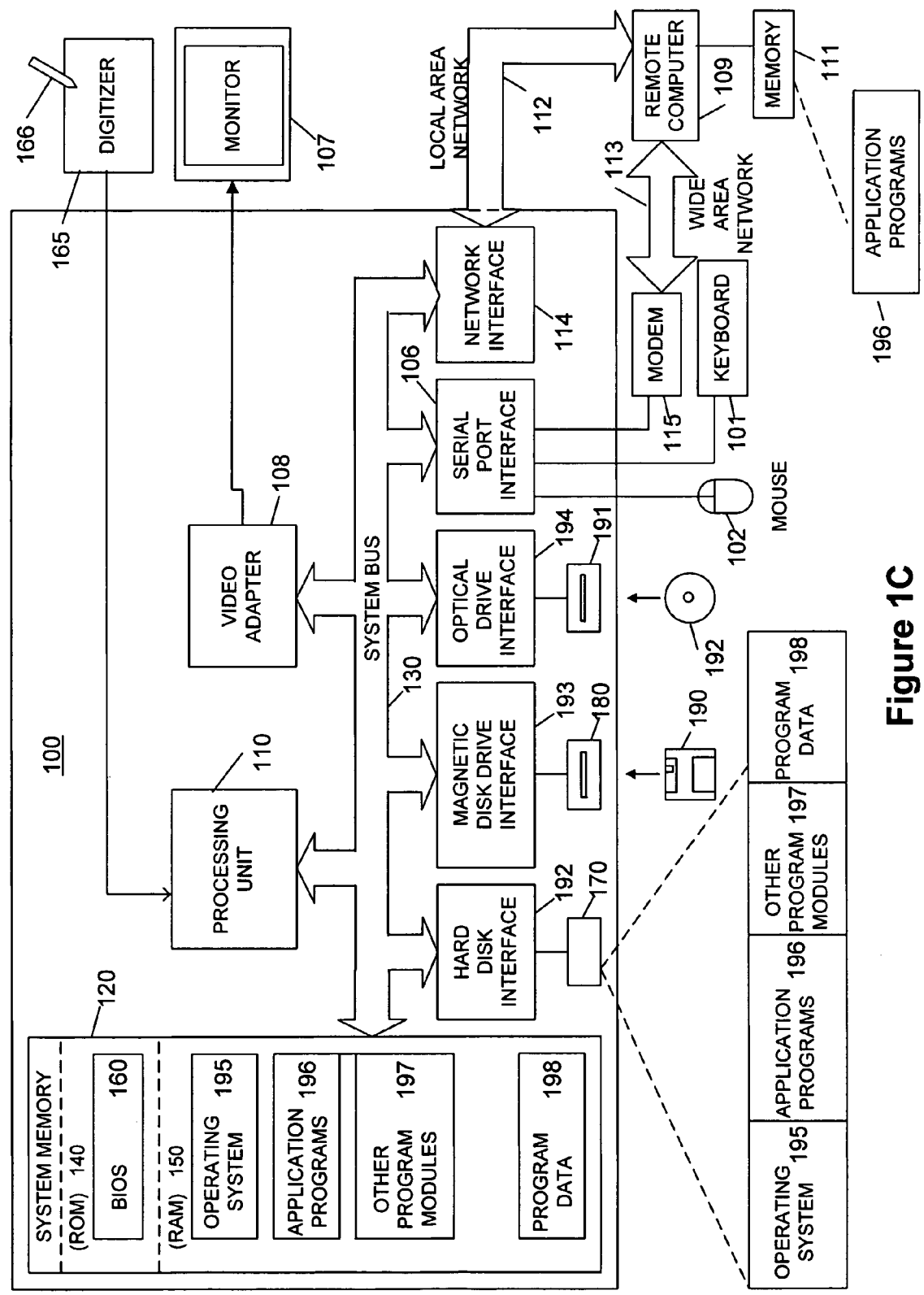
FIG. 1C illustrates a block diagram of a general purpose computer system usable to support aspects of the present invention.

FIG. 1C illustrates a schematic diagram of an exemplary conventional general-purpose digital computing environment that can be used to implement various aspects of the present invention. In FIG. 1C, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In some embodiments, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1C include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

While the present invention accelerates scrolling based on a distance already scrolled, the present invention can be used in conjunction with accelerated scrolling based on the motion speed detected by a motion sensing input device. Speed-based accelerated scrolling increases the number of scroll messages based on the time difference between scroll events (e.g., notch clicks) received from an input device. The faster a user scrolls, the smaller the time difference between scroll messages. The scrolling algorithm measures this time difference and applies a corresponding gain. The smaller the time difference, the larger the gain. For example, in a slow stroke of a mouse wheel the time difference between notch clicks is larger compared to a fast stroke of the wheel. When the user does not scroll fast, the scrolling control may revert to sending a single scroll message per wheel notch, thus allowing the wheel to maintain precision for scrolling short distances.

While the invention is described primarily in relation to accelerating scrolling through a text document, it will be appreciated that any data content may be navigated including, but not limited to, pages from the Internet, images, spreadsheets, calendars, and the like. Also, scrolling can include navigation of non-viewable media, including moving forward and backward through audio, video, and multimedia data files. Still further, the invention may be applied to other data file navigation functionality such as "zoom" features for zooming in and out on an image file or the like. The invention may be implemented using C. It will be appreciated that versions of other languages may be used, including C++, C#, Visual Basic, assembly language, and the like. Any programming language that can produce a computer-executable algorithm following the steps of the invention may be used.

While the invention is described primarily in relation to a wheeled mouse providing a scrolling functionality, it will be appreciated that the invention is applicable to various other input devices providing a scrolling functionality, e.g., any computer or computer peripheral equipped with a scrolling wheel, such as a keyboard, trackball, stylus, tablet, joystick or game pad, hand-held or tablet computer, and other common devices familiar to those skilled in the art. The invention may also be applied to other low-resolution sensors that can be operated in a method analogous to a scrolling wheel, such as a low-resolution touch pad with a series of contact sensors that the user strokes their finger across, or a sensed moveable treadmill, similar to a tank tread that you push with your finger. Any combination of the above may also be used, for example, a keyboard with an integrated scrolling wheel.

A known wheeled computer mouse as shown in FIG. 1A may be used in connection with the present invention. In general, the distance scrolled through a document depends on the speed of rotation of the wheel 103. The rotational speed of the wheel may be determined by known means such as an optical encoder assembly. In some embodiments the wheel may contain notches through which tactile feedback is provided to a user to assist the user in determining how far the user has rotated the wheel. When the wheel is rotated slowly, the elapsed time since the last notch indent will be relatively high. In accordance with the present invention, under these circumstances, the resulting scroll rate may be a predetermined user-selectable scroll rate such as one line per notch indent or three lines per notch indent. When the wheel is rotated at greater speeds, the elapsed time between notch indents will decrease. In accordance with the present invention, scrolling may be accelerated under these circumstances in direct relation to the rotational speed of the wheel.

Figure 2A:
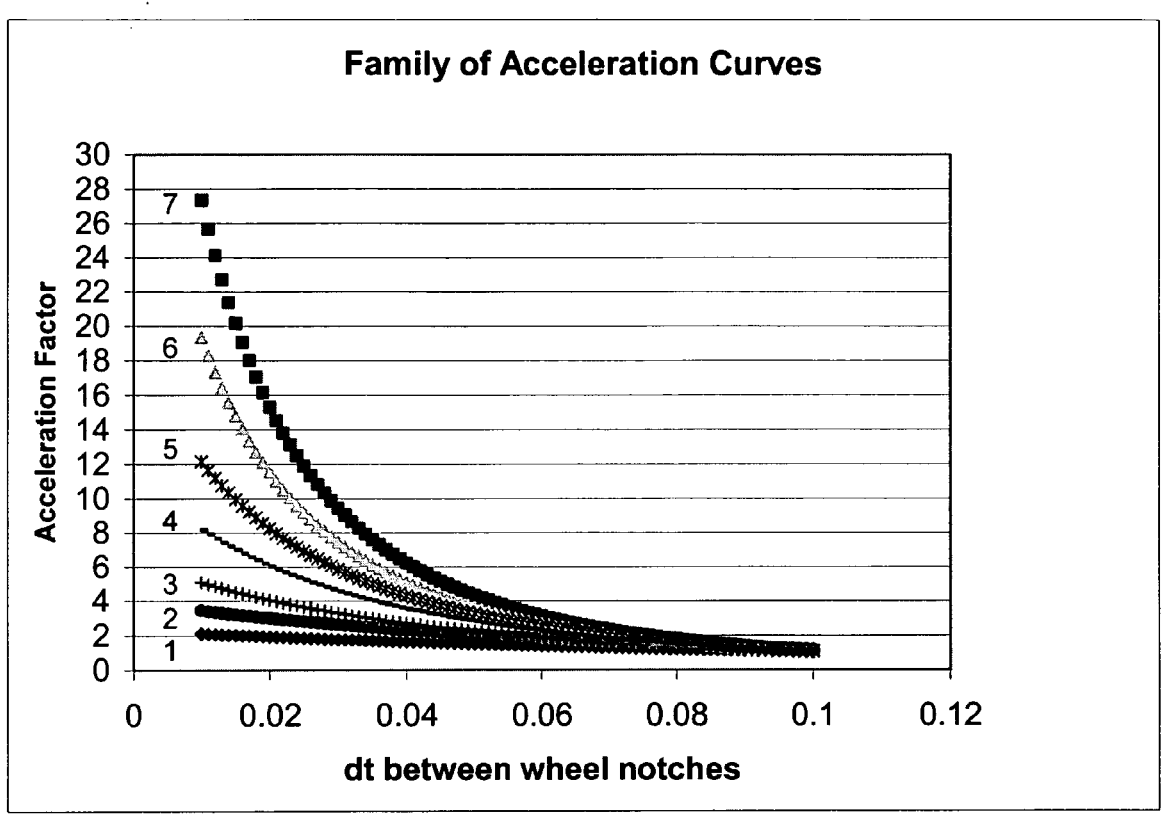
FIG. 2A is a graph showing a family of acceleration curves in accordance with an embodiment of the invention.

The accelerated scrolling of the present invention may be implemented based upon acceleration curves similar to any of the family of acceleration curves shown in FIG. 2A. Each of these curves may be used to determine a continuously variable scroll rate based on the speed of the user's actuation of an input mechanism, e.g., rotation of a mouse wheel (or other rotational member). While various acceleration curves are possible, acceleration curves which meet the following criteria are believed to provide the most intuitive and desirable accelerated scrolling characteristics: 1) acceleration should begin when the rotational speed is greater than approximately twenty degrees (or one notch indent on a Microsoft IntelliMouse) per one-tenth of a second. Notches separated by more than one tenth of a second are preferably treated as discrete, single scrolling events without scrolling acceleration (as on a traditional system); 2) acceleration should occur gradually enough so that the user can visually track the document without perceptible jumps (that may be disorienting); and 3) one rapid stroke of the wheel should scroll approximately one full screen of information. Other criteria may be used as well or in place of the above.

It is from working within these design criteria that the inventors developed the exponential acceleration curves shown in FIG. 2A, which may be expressed mathematically as:

$$\Delta y = C + K_1(1 + K_2 \Delta t)^\alpha \qquad \text{(Equation 1)}$$

However, non-exponential functions may alternatively be used, including, or example, logarithmic, linear, and stepped acceleration functions.

In Equation 1, $\Delta y$ is the resulting scroll acceleration factor, $\Delta t$ is the time (measured in seconds) between notch indents, C is a constant to adjust the baseline of the curve, $K_1$ is a first gain factor, $K_2$ is a second gain factor applied to $\Delta t$, and $\alpha$ is the nonlinear (exponential) parameter. A range of values may be used to generate a family of acceleration curves producing differing amounts of acceleration, depending on a user's preference. The ranges of values $75 >= K_1 >= 2$, $30 >= K_2 >= 3$, and $-2 >= \alpha >= -5$ are believed to produce a suitable family of curves. Alternatively other values may be used, for example, based on the sampling rate, the specific input device being used, the device resolution, and the like. The values used to produce the curves in FIG. 2A are as follows:

| Curve | $K_1$ | $K_2$ | Alpha | C |
|-------|-------|-------|-------|---|
| 1 | 2.3 | 3 | −3 | 0 |
| 2 | 4 | 5 | −3 | 0 |
| 3 | 6.5 | 8.5 | −3 | 0 |
| 4 | 11.5 | 12 | −3 | 0 |
| 5 | 19 | 16 | −3 | 0 |
| 6 | 36 | 23 | −3 | 0 |
| 7 | 56 | 27 | −3 | 0 |

The most appropriate values for any given application will depend on various factors including the type of device used, the scrolling resolution of the device used, the refresh rate of the configuration, and the expected gain of the device. For instance, devices with higher resolution may require values that produce acceleration for smaller $\Delta t$ values because the notch indents are closer together, or sampling intervals are smaller.

The resultant scroll rate may be arrived at by adjusting the number of lines to scroll per scroll event. This can be accomplished by adjusting either the number of lines to scroll per scroll message, or by adjusting the number of scroll messages to be executed per scroll event. Because the scroll amount per notch indent may be user-selectable, as described in the Background, a system with a wheeled mouse may scroll one line per notch indent, three lines per notch indent, or some other user selected number of lines per notch indent. In this specification, it is assumed that the number of lines to scroll per notch indent is one. However, it should be apparent to those skilled in the art that other values may be used.

Figure 2B:
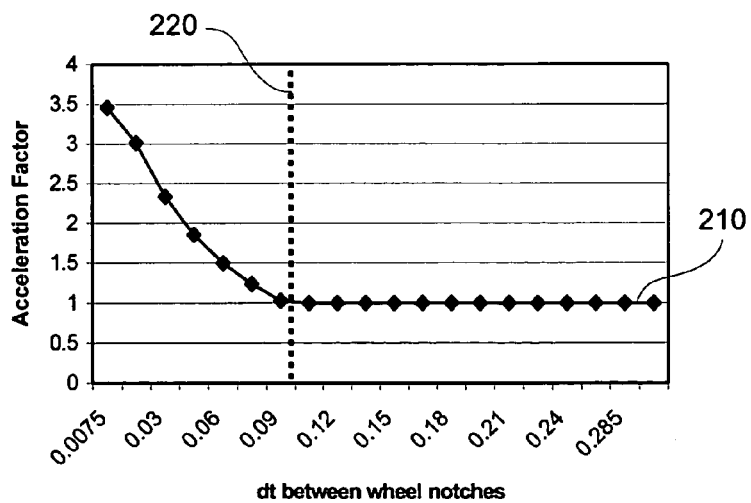
FIG. 2B is a graph showing an acceleration curve rounded up in accordance with aspects of the invention.

In some embodiments, as shown in FIG. 2B, if the rotational speed produces a scroll rate of less than one line per notch indent, the scroll rate may be rounded up to one line per notch indent. That is, all resultant scroll rates that would otherwise be below line 210 are rounded up to one line per notch indent to produce the acceleration curve shown in FIG. 2B. Thus, all points to the right of line 220 are rounded up to one, and all points to the left of 220 are accelerated based upon the curve. Alternatively, the result may be rounded down to zero or any other value, based on the time between scroll inputs received from the input mechanism.

The same acceleration curve may be used for both scrolling up ("up-scrolling") and scrolling down ("down-scrolling"). However, many users find up-scrolling more difficult than down-scrolling. Thus, in one embodiment of the invention, to accommodate the difficulties associated with up-scrolling, the values for C, $K_1$, $K_2$, and $\alpha$ used for up-scrolling may be different than the values used for down-scrolling. It has been found desirable to modify the values of $K_1$, $K_2$, a and C so as to increase the scrolling rate by approximately 20% in up-scrolling as compared to down scrolling. However, this rate may be modified up or down. For example, the values C=0.67, $K_1$=5, $K_2$=9, and $\alpha$=−4.5 have been found to provide suitable results during up-scrolling, based on a down-scrolling curve using the values C=0, $K_1$=4, $K_2$=8, and $\alpha$=−2.5.

The system may permit the user to select an acceleration curve from a family of acceleration curves, e.g., those shown in FIG. 2A, that would produce low, medium, or high acceleration rates, depending on the user's preferences.

Initial performance tests of the inventive accelerated scrolling system suggest that user performance is unaffected for short scrolling distances, is 15% faster when scrolling medium distances, and is approximately 200% faster when scrolling longer distances. Timed testing was utilized to measure performance based upon how quickly users accomplished particular tasks. On average, when using accelerated scrolling, the mean rotational speed of the wheel was observed to be slower, and rotational speeds were distributed over a wider range, than when scrolling without accelerated scrolling. This suggests there may be a biomechanical advantage to using accelerated scrolling by slowing the speed of repetitive finger motions.

In many software applications, spinning a mouse wheel or the like may perform functions other than scrolling. For example, holding down the CTRL key on a conventional keyboard while rolling the wheel causes many applications to zoom in on a document, rather than scroll. Acceleration may be applied in such circumstances. In some embodiments, the device driver (or application software or device firmware, as described below) may disable acceleration when the wheel or other rotational member is to perform a function other than scrolling.

Figure 3:
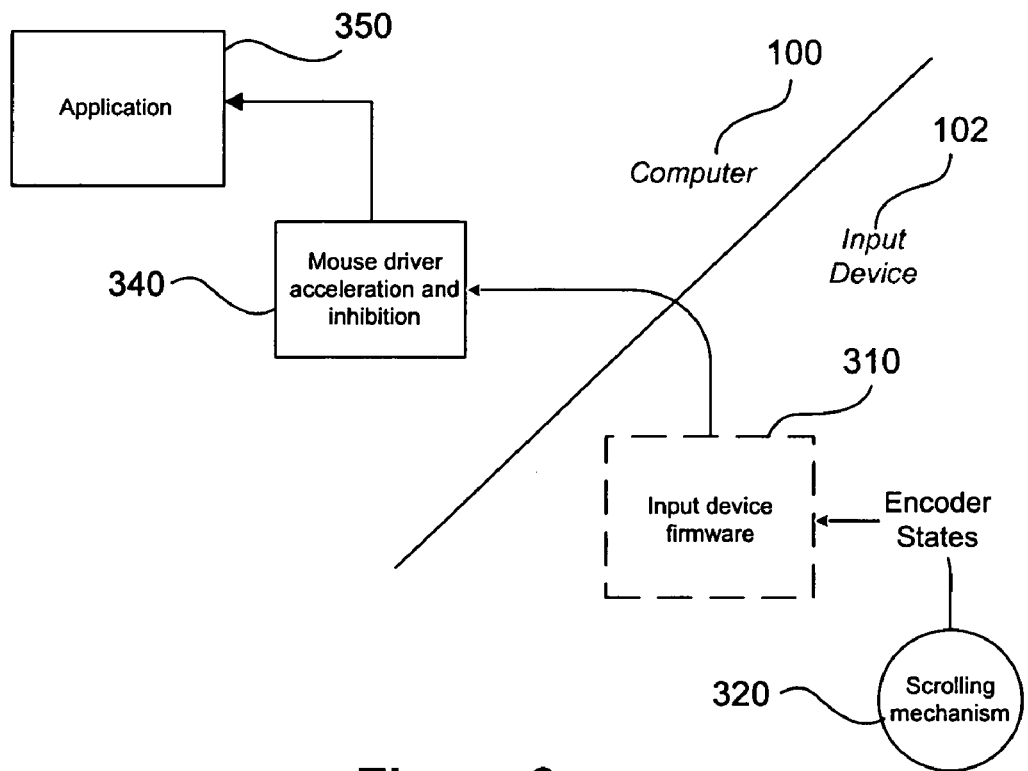
FIG. 3 is an example of a diagrammatic depiction of a mouse driver implementation of the present invention.

In one embodiment, acceleration may be optimally implemented in a mouse driver as shown in FIG. 3. In another embodiment, acceleration is implemented in the device firmware 310. It is also possible to implement the invention at the application level. That is, individual software applications may incorporate the disclosed scrolling modes on a selective basis. However, one may alternatively implement the scrolling modes in the driver or device firmware to prevent software developers from being required to update each of their software applications. The illustrated system includes an input device such as a mouse 102, and a computer 100. The input device includes firmware 310 and a navigation input component 320, such as a wheeled mouse or trackball, or a touchpad. The computer 100 includes an input device driver 340 and application software 350. The driver 340 detects the time between scroll events (e.g., rotation of the wheel an amount corresponding to a notch click) received from the device firmware 310. The driver applies the previously described acceleration curve (see FIG. 2) by multiplying the number of scroll events by an acceleration factor $\Delta y \geq 1$ computed with Equation 1. The driver then provides the accelerated scrolling information to the application software. To avoid floating point mathematical operation, the curve can be implemented by way of a look-up table. A look-up table can also avoid the need for processor intensive exponential operations to be carried out in the mouse driver. In many computer systems, it is necessary to use fixed-point computation techniques in the mouse driver because floating-point operations are not available at the driver's security ring.

As described above, the driver (or firmware or application) may enforce a rounding-up of the scrolling amount to an integer number of lines. Alternatively, accelerated scrolling using fractional lines of display may be allowed. Some applications may only support scrolling by increments of a single display line or other integer amounts.

With conventional scrolling, when a user overshoots an intended location in a document, a common reaction is to quickly reverse scroll, i.e., scroll in the opposite direction. Scrolling acceleration may cause the user to again overshoot the intended location in the reverse direction, because the user's reaction to the initial overshoot may, in effect, be amplified by the acceleration. To address this potential problem, in the embodiment of the invention shown in the flowchart of FIG. 4, inhibition is used to momentarily inhibit acceleration upon occurrence of a sudden change in direction of wheel rotation. Using an inhibition timer, acceleration is prevented for a predetermined amount of time upon detection of a change in the direction of wheel rotation. An inhibition time of approximately 200–500 ms has been found to be useful. However, the inhibition timer may be set to any amount of time. Inhibition after a direction change can be implemented using a simple state machine in the device driver or firmware, as described below.

Figure 4:
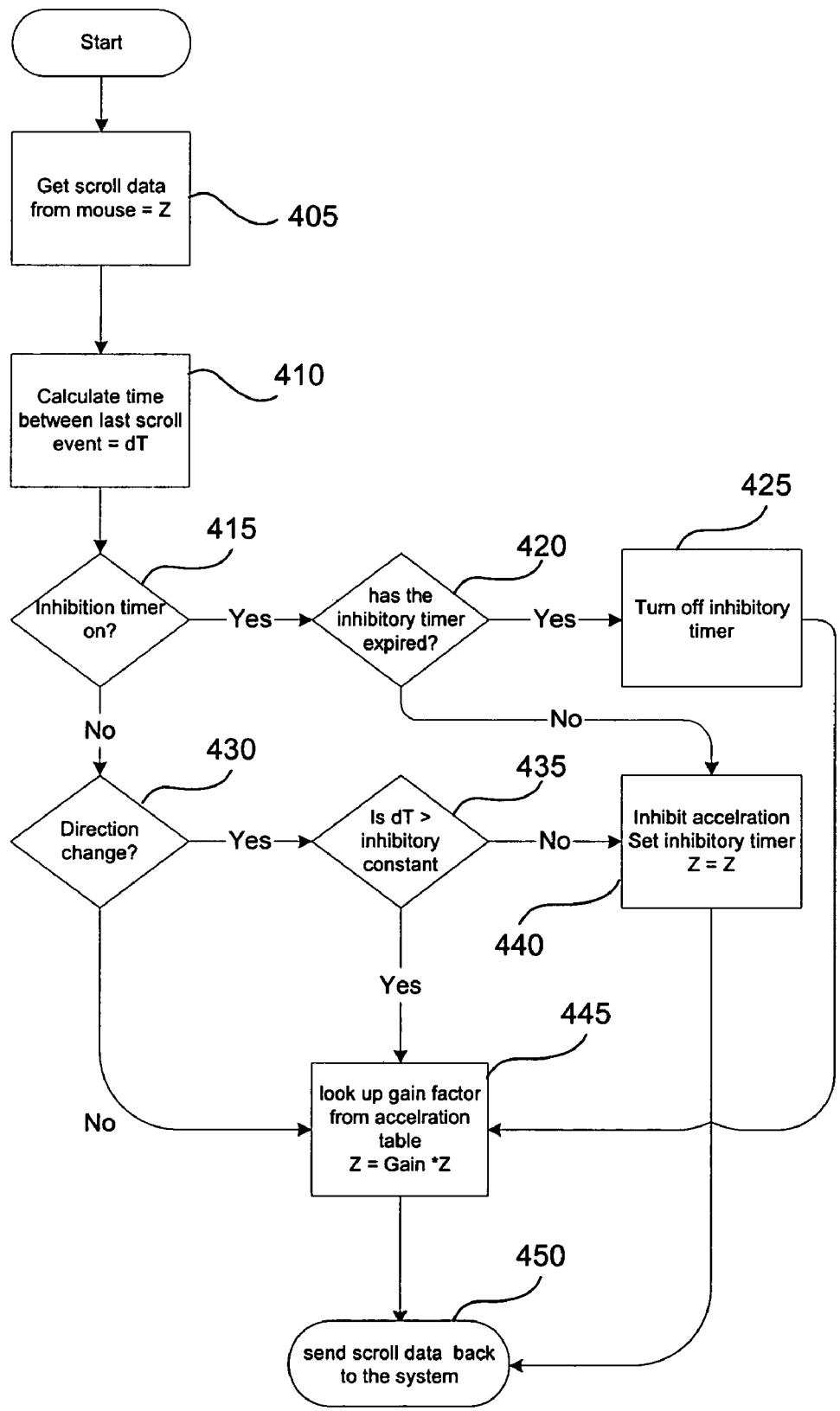
FIG. 4 is an example of a control flowchart showing process steps for determining inhibition of acceleration in accordance with aspects of the present invention.

Referring to FIG. 4, scroll data from the wheeled input device is received in step 405. After receiving the scroll data, the system calculates in step 410, the time Δt between the last scroll event (e.g., notch click) and the present scroll event. In step 415, the system determines whether the inhibition timer is on as a result of a previous direction change. If the inhibition timer is on, control proceeds to step 420. If the inhibition timer is off, control proceeds to step 430. In step 420, the system checks to determine whether the inhibition timer has expired. That is, the system determines whether an elapsed time is greater than a preset inhibitory constant. If the elapsed time is greater than the inhibitory constant, the inhibition timer is turned off in step 425 and proceeds to step 445. If the elapsed time does not exceed the inhibitory constant, the system inhibits acceleration in step 440, and outputs the scroll data (without any acceleration) in step 450.

If the system determines that the inhibition timer is off in step 415, the system checks whether there has been a direction change in step 430. If there has been a direction change, the system checks, in step 435, whether the elapsed time between the last scroll event and the present scroll event is greater than the inhibitory constant. As will become apparent, this is done so that acceleration is not inhibited when the user changes scrolling direction after longer periods of time, such as after a user scrolls to a location in a document, reads for a few seconds/minutes, then scrolls quickly back up to the beginning of the document.

If the result in step 435 is that the elapsed time is less than the inhibitory constant, the system inhibits acceleration in step 440 and outputs the inhibited scroll data in step 450. If, however, the elapsed time is equal to or greater than the inhibitory constant, the system looks up the resulting scroll rate in the look-up table in step 445, and outputs the accelerated scroll data in step 450. If the system determines, in step 430, that no direction change has occurred, the system looks up the resulting scroll rate in the look-up table in step 445, and outputs the resulting scroll data in step 450.

Figure 5:
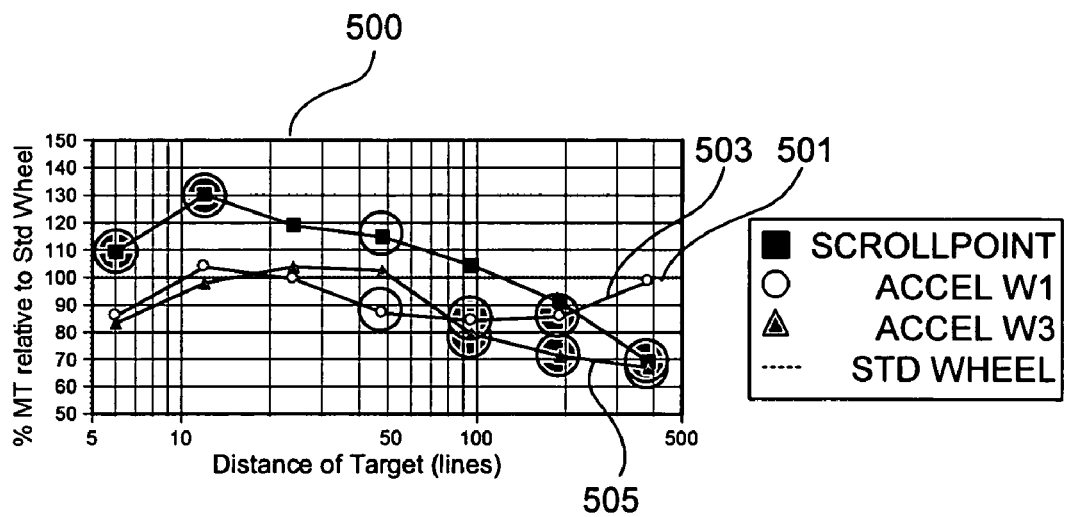
FIG. 5 illustrates test results using variations of the algorithm of FIG. 4.

FIG. 5 illustrates test results using the above-described algorithm. Graph 500 illustrates users' mean scroll time to scroll a number of lines relative to time 501 using an unaccelerated wheel set to scroll three lines per notch. Line 503 illustrates mean scroll times to scroll various distances using a wheel accelerated according to the above description and whose lines per notch setting is set to one line per notch. Line 505 illustrates mean scroll times to scroll various distances using a wheel accelerated according to the above description and whose lines per notch setting is set to three lines per notch. Graph 500 indicates that, scrolling up to approximately eighty lines, an accelerated wheel set to scroll one line per notch performs substantially the same as or better (e.g., faster) than an accelerated wheel set to scroll three lines per notch. However, the accelerated wheel set to scroll three lines per notch performs better than the accelerated wheel set to scroll one line per notch when the scrolling distance is greater than eighty lines.

Graph 500 indicates that it would be advantageous to perform accelerated scrolling using the one line per notch setting for distances of under eighty lines, and to perform accelerated scrolling using the three lines per notch setting for distances of over eighty lines. However, requiring a user to switch between one and three lines per notch depending on the distance to scroll is tedious and quickly frustrates the user. Thus, in one embodiment of the invention, distance-based accelerated scrolling is also used to gradually adjust the acceleration factor from a one line per notch baseline to a three line per notch baseline. That is, scrolling is accelerated based on the distance the user has already scrolled during an ongoing series of scroll events. The mouse driver (or firmware, etc.) may calculate the distance scrolled during the current action or series of actions based on time-outs between atomic scrolling events and other heuristics.

In one embodiment, again using a conventional wheel mouse for illustration, distance-based accelerated scrolling improves performance by looking at a user's pattern of movement across multiple actuations, or flicks, of the wheel. The user's wheel input may be used as an approximation of distance. Scrolling efficiency is improved by recognizing when a user has already scrolled a considerable distance and continues to scroll in a manner indicative of extending the current scrolling action, and dynamically altering the wheel gain factor in response thereto. Some aspects of the invention may recognize when the user slows down, reverses direction, or pauses so that the user can regain fine scrolling precision at the terminus of his or her movement.

While various embodiments have been described with reference to scrolling with a mouse wheel, distance-based accelerated scrolling can also be implemented for any position or motion-sensing input device, i.e., any position and/or motion sensing device with $0^{th}$ or $1^{st}$ order control. Distance-based accelerated scrolling can be used to enhance performance with a touchpad or trackball, since a user also operates these devices by making multiple strokes (i.e., device acquisition, movement, release, device re-acquisition, etc.) to move long distances. Also, distance-based accelerated scrolling may also be used for purposes other than scrolling, such as to aid cursor positioning using a touchpad on a laptop computer.

A device that senses tilt angle may also apply the inventive techniques when a user tilts it multiple times. One of skill in the art will appreciate that $2^{nd}$ or higher order controls may also benefit from the invention, for example, by doing a distance-based modulation of the transfer function for a Trackpoint, or stepping up the gain factor as a user "tugs" it multiple times in a row.

Distance-based accelerated scrolling, as implemented with a wheel, uses the act of a user flicking the wheel multiple times in a row as a means to dynamically alter the gain factor. By keeping track of how far the user has moved so far, the software can switch between various techniques for that scrolling distance. That is, one or more multiple successive cycles of device acquisition, movement, release, device re-acquisition, etc., may be used to control the gain factor. In alternative embodiments, a computer system may optionally calculate the exact distance a user has scrolled during an ongoing scroll process. However, counting the number of flicking motions is preferable as it corresponds better with the user's perception of how much effort he or she is exerting during the scrolling action. Also, counting flicking motions has the effect of normalizing differing flick amounts across users so that all users benefit from increased scrolling efficiency, even if a user tends to make smaller (or larger) flicks than other users. On some devices, however, such as on a wheel with mechanical momentum that causes it to continue spinning between successive flick-release cycles, it may not be possible to reliably detect individual flicking motions, so the actual scrolling distance may be used instead.

In one embodiment of the invention a computer approximates the distance already scrolled, using a filter that detects multiple flicks of the wheel in a row. A flick refers to the act of a user quickly rolling the wheel in an apparent effort to scroll a long distance. The filter uses the time difference between events for adjacent wheel notches to approximate the speed with which the user is actuating the wheel, and uses predefined heuristics to determine if the present wheel flick is part of one long scrolling movement, or separate ones. For example, a rapid series of wheel events, followed by a brief pause, followed by a second rapid series of wheel events may represent a single unitary scrolling movement that the user is trying to achieve. However, a rapid series of wheel events, followed by a long pause, followed by a second series of rapid wheel events most likely represents two separate scrolling movements by the user that should be treated separately by the computer system.

The wheel gain factor may default to a small value, such as one line per notch. Other lines per notch settings may alternatively be used. Each successive time the user flicks the wheel, the control system increases the lines per notch setting according to the accelerating algorithm. Thus each successive turn of the wheel gradually scrolls a greater distance than the previous flick. In some embodiments, the gain factor may increase in uniform steps. In other variations, the gain factor may increase based on a nonlinear function (e.g. changing quickly at first, but then reaching an asymptotic maximum value after a few flicks). In still other variations, a maximum value for the gain (e.g., ten lines per notch) can be imposed to prevent the gain factor from becoming arbitrarily large with repeated flicks of the wheel.

Some aspects of the invention inhibit the gain adjustment until it overcomes the default lines per notch setting. For example, assume if the lines per notch setting is three lines per notch. Internally the gain adjustment may start increasing from zero, to 0.6, 1.2, 1.8, etc. When the gain adjustment reaches a value greater than three it starts to be applied to the output. This allows a user to use three lines per notch as the default setting, but closely maintains performance to the optimum values shown in FIG. 5. Alternatively, the algorithm may simply start incrementing from the current lines per notch setting (e.g. 3.0, 3.6, 4.2, etc.). The algorithm may use a different gain step size or nonlinear function for the successive gain factors depending on the starting lines per notch setting.

Some aspects of the invention may also detect when the user stops his or her series of successive scrolling events. Three basic criteria may be used to decrease the gain factor. When any criterion is met, the gain factor may reset back to a default value (e.g., one line per notch). However, other variations are possible where the gain factor decreases in steps (or some non-linear function), just as it increases in steps during acceleration. The criteria allow the user to perform precise scrolling movements at the terminal phase of the scrolling sequence even if the gain factor may have become large after moving a long distance during the scrolling sequence. While three criteria are described below, other criteria may be used in conjunction with or in place of the following.

The first criterion is whether the user reverses scrolling direction. When the control system detects that the user reverses direction, the gain reverts back to one line per notch (or some other default value in use). The second criterion is whether the user slows scrolling to a sufficient level. If so, the gain value also reverts back to the default value. The average speed of the current wheel rotation may be used to determine when the user is slowing down. The third criterion is whether a long pause occurs after a series of scrolling actions; if this pause is greater than a timeout threshold, then the gain is also reduced or reset to its base value.

By including criteria for decreasing the gain factor as well as increasing the gain factor based on distance, scrolling long distances is more efficient, yet users preserve the ability to make fine corrections requiring a small gain factor. This behavior is transparent to the user in that the user does not need to perform in any manner other than that to which he or she is already accustomed.

Figure 6A:
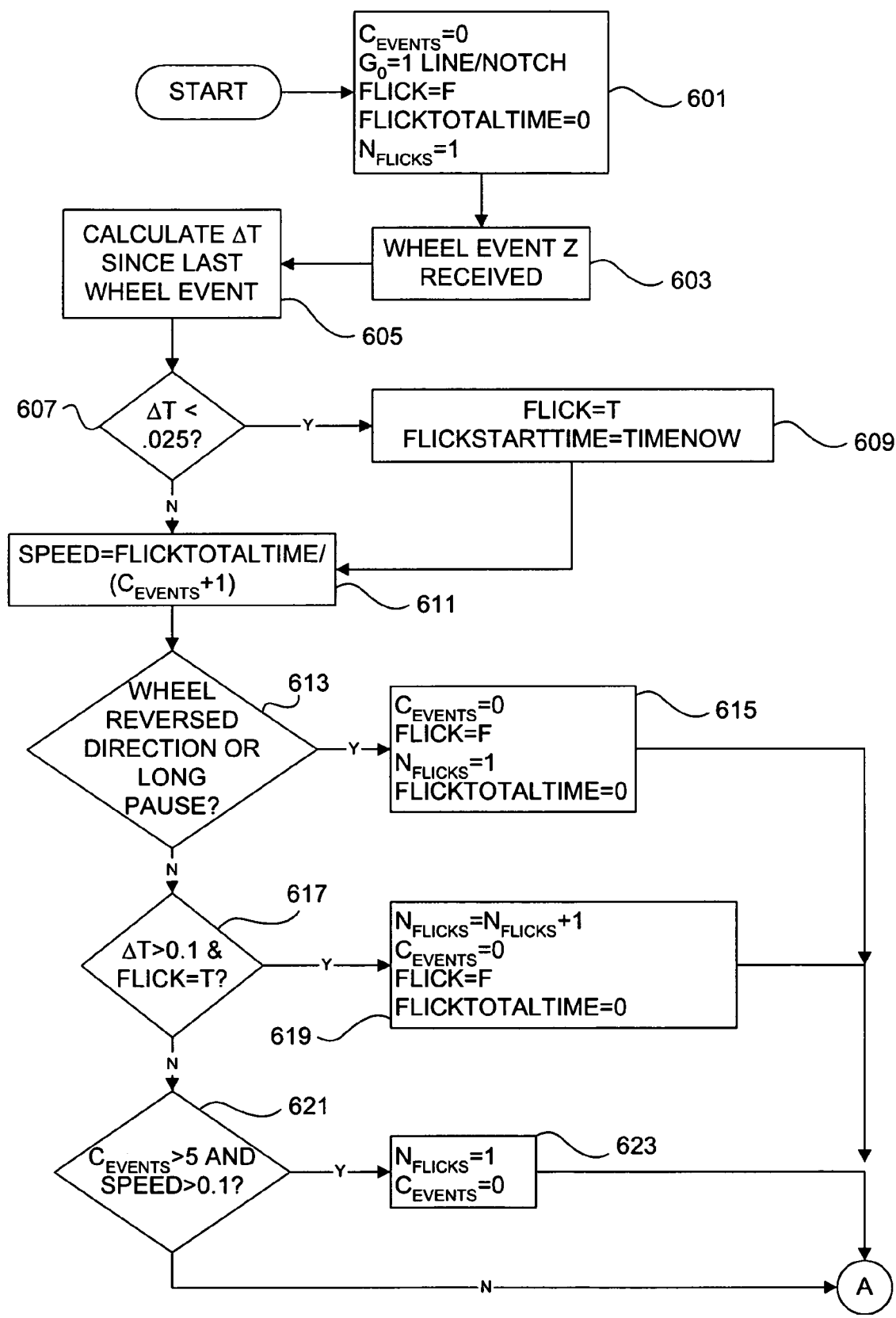
FIGS. 6A and 6B illustrate a control flow chart showing process steps for determining acceleration based on distance scrolled in accordance with aspects of the present invention.
Figure 6B:
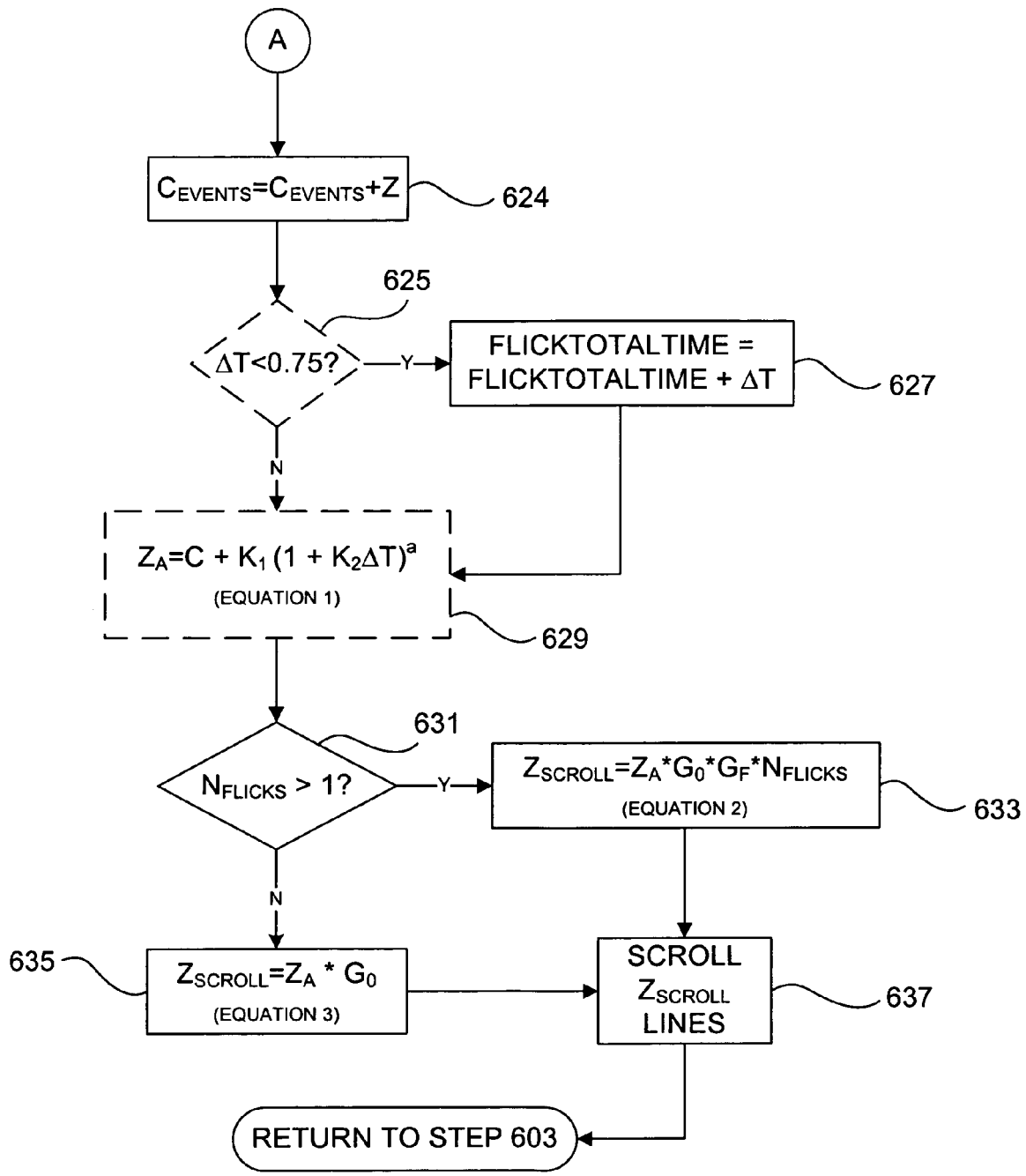

FIGS. 6A and 6B illustrate a flowchart of a method for performing distance-based accelerated scrolling using a wheel mouse. The method uses state variables to indicate whether the user is in the process of flicking the mouse wheel and, if so, to indicate how many successive flicks have occurred. The gain factor may be adjusted based on the speed with which the user is flicking the wheel and/or the number of successive flicks of the wheel that the user has performed. The user may also have a manually selectable option for the step size (or nonlinear function) for the series of gain factors to be used.

In step 601, the system initializes variables used throughout the process steps. A count $C_{events}$ of wheel events in the current flick is initialized to zero. The baseline gain $G_0$ of lines per notch is retrieved from the current mouse settings. For example, if the user has set the default lines per notch setting to three lines per notch, the system initialized $G_0$ to three lines per notch. However, because the present invention addresses the need for gradual acceleration from one line per notch to three or more lines per notch, one line per notch as a baseline may be preferable. In this example, one line per notch is used. The state Flick indicating whether a flick is in progress is initialized to False. The time duration FlickTotalTime of the current wheel flick is initialized to zero, and the number of successive flicks $N_{flicks}$ is initialized to one.

In step 603, the system receives a wheel event. A wheel event may indicate that the user moved the wheel one or more notches. The number of notches Z received in a single wheel event may be greater than one when the user moves the mouse wheel faster than the mouse hardware, firmware, or software processes mouse input.

In response to receiving the wheel event, the system in step 605 calculates the amount of time Δt that has elapsed since the previous wheel event was received. In step 607, the system determines whether the user is in the process of flicking the wheel. That is, the system uses Δt to determine how fast the user is moving the wheel based on a known distance of notches in the wheel being used. If Δt is less than a predetermined amount, the user is said to be flicking the wheel. Wheels with different notch granularities may compare Δt to different values to indicate that the user is flicking the wheel. In the present example, using a wheel with eighteen notches per revolution (one notch every twenty degrees), the value 0.025 seconds has been shown to work well. Other values may alternatively be used based on human factors, preferences, device resolution, device sampling rate, etc.

If the user is in the process of flicking the wheel, the system in step 609 changes Flick equal to true, and FlickStartTime equal to the time that the most recent wheel event was received. After changing the variables, the system proceeds to step 611. If, in step 607, the system determines that the user is not flicking the wheel, the system skips step 609 and proceeds directly to step 611.

In step 611 the system calculates Speed, which indicates the average speed with which the user is moving the wheel. Speed may be calculated as FlickTotalTime divided by ($C_{events}$+1). FlickTotalTime may be calculated as the time that the most recent wheel event was received minus FlickStartTime.

In step 613 the system determines whether the wheel reverses direction and, if so, resets state variables accordingly in step 615. In step 613 the system also determines whether there has been a long pause between successive wheel events, which has the same consequences as reversing directions. In step 613, the system compares Δt to a predetermined long pause value, e.g., 750 ms. In some aspects of the invention, the value Δt used in step 613 may be the same as the value Δt used in step 625. However, in other aspects of the invention they may have different values. Preferably, a long pause value of 500–750 ms is used in step 613, whereas Δt is preferably 750 ms or longer in step 625. The value Δt used in step 625 is preferably greater than or equal to the value of Δt used in step 613.

In step 615 the count of wheel notches $C_{events}$ during the present flick is reset to zero, Flick is reset to false, $N_{flicks}$ is reset to one, and FlickTotalTime is reset to zero. After step 615, the system proceeds to step 624.

If the wheel did not reverse direction or detect a long pause in step 613, the system determines in step 617 when the user is briefly pausing between wheel flicks (a flick pause) in order to release and reacquire the wheel for another flick. If Δt is greater than a flick pause predetermined value (0.1 seconds in the present example), and Flick is True, then the system assumes the user is only pausing between wheel flicks, not stopping his or her scrolling, and changes variables accordingly in step 619, including the increment of $N_{Flicks}$. In step 619 the system increments $N_{flicks}$ by one, resets count $C_{events}$ to zero, resets Flick equal to false, and resets FlickTotalTime to zero. The system then proceeds to step 624.

If the system did not detect a short pause between flicks in step 617, then the system determines in step 621 whether the user is slowing down in order to regain fine scrolling ability. If count $C_{events}$ is greater than a predetermined value and Speed is greater than a predetermined value, then the system determines that the user is slowing down, and resets the $N_{flicks}$ and $C_{events}$ variables in step 623. When a wheel with 18 notches per revolution is used, the predetermined value 5 has been found to work well. Factors to take into consideration when determining the predetermining value include that, at the beginning of a flick, the user's finger is typically still accelerating during the first few wheel events. Thus, it can be difficult to determine whether the user is just starting to accelerate, or whether they are now moving at a slower speed. On an 18-notch wheel, it takes about 3–6 wheel events from the flick to determine this. If $C_{events}$ is set too small, then the user must keep moving fast throughout the flick or the gain is reset to 1. If $C_{events}$ is set too large, then the algorithm does not recognize when the user slows down, but is still moving the wheel (i.e., no reversal or lengthy pause). On devices with other resolutions, other predetermined values may be used.

After step 623, the system proceeds to step 624. If the system in step 621 determines that the user is not slowing down, then the system skips step 623 and proceeds directly to step 624. In step 624 the system increments $C_{events}$ by the number of wheel notches Z received during the last wheel event, and proceeds to step 625.

In step 625 the system determines whether to recalculate FlickTotalTime. Including reclutch time (i.e., the user's flick pause time to reacquire the wheel) in FlickTotalTime may interfere with an accurate calculation of Speed (for example, if you had paused for 5 seconds since the last scrolling action, adding this 5 seconds into the calculation of average wheel velocity would drastically dilute the value and make it smaller than intended). Thus, the system might only increment FlickTotalTime by Δt in step 627 if the system first determines that Δt is less than a predetermined value (0.75 seconds in the present example) in step 625. The predetermined value may be based on the number of wheel notches per revolution, human factors (e.g., how fast an individual can manipulate a wheel), and the like. Otherwise, the system skips step 627 and proceeds directly to step 629.

Optional step 629 performs speed-based acceleration, and may be included in embodiments where acceleration is both speed-based and distance-based. In step 629, the system accelerates scrolling using Equation 1 (described above) based on how fast the user is flicking the wheel. In Equation 1, the value C refers to a constant as described above with respect to Equation 1, and not to the value $C_{events}$.

Steps 631–637 accelerate scrolling based on the distance the user has scrolled, approximated by the number of flicks, based on the state variables described above. In step 631, the system determines whether the number of flicks is greater than one. If so, the system calculates in step 633 the amount of lines to scroll, based on any distance-based acceleration, using equation two:

$$Z_{scroll} = Z_A * G_0 * G_f * N_{flicks} \quad \text{(Equation 2)}$$

where $G_f$ represents the additional gain factor to increase per wheel flick.

If the number of flicks is not greater than one, the system calculates in step 635 the amount of lines to scroll using equation three:

$$Z_{scroll} = Z_A * G_0 \quad \text{(Equation 3)}$$

(i.e., applies no distance-based acceleration). Both steps 633 and 635 proceed to step 637, where the system scrolls by $Z_{scroll}$ lines. After step 637, the system returns to step 603 to wait for another wheel event.

$G_f$ may be any predetermined value that increases the gain an appropriate amount according to user expectations, preferences, and the like. $G_f$ with value 0.6 has been shown to work well in user tests. The value 0.6 also represents the fact that approximately five flicks are typically required using speed-based acceleration, without distance-based acceleration, to scroll a distance of 100 lines. At 100 lines in FIG. 5, three lines per notch begins to yield better performance than one line per notch. Thus, gain should gradually be increased to three lines per notch over five wheel flicks, which results in an increase of ⅗ (0.6) gain increase per flick. For example, on a series of five flicks, the gain factors applied would be 1.0 (0.6 rounded up to 1.0), 1.2, 1.8, 2.4, and then 3.0.

The present embodiment, in order to avoid reducing the gain factor during the first flick, rounds $G_f$ up to one when $N_{flicks}=1$ by skipping step 633, and instead only using (optional) rate-based acceleration. When $N_{flicks}=2$, the additional gain is $2*G_f$, or 1.2. When $N_{flicks}=3$, the additional gain is $3*G_f$, or 1.8, etc. In some embodiments, the additional gain (i.e. $N_{flicks}*G_f$) may be capped so as to prohibit non-user-friendly large gain values. For example, $N_{flicks}*G_f$ may be capped at any arbitrary value such as 3, 5, or any other value determined by the user, programmer, etc. $G_f$ may alternatively be capped based on the current window size (visible portion of the document or screen size) such that the gain factor will not increase to a value greater than a single visible page per notch. In practice, other values of $G_f$ from approximately 0.1 to 7.5 may be useful, depending upon the application and user preferences. A $G_f$ value of approximately 0.6 yields acceptable performance for typical scrolling tasks in documents. Larger values of $G_f$ can be useful in applications where one item of many (thousands) needs to be selected from a sorted list, for example.

It should be appreciated by one of skill in the art that for wheels of differing resolutions (i.e., those that have other than 18 notches per revolution), with different sampling rates in the hardware or operating system, or with different types of sensors (e.g., touchpad, trackball, etc.), the details of the algorithm may vary, including differing values to determine when a user is "flicking," slowing down, paused, etc. The process may be used with any device in which a user reclutches (repetitive cycles of engagement/disengagement) to move long distances. The process may also be used when a computer system detects that the user is repetitively moving a mouse from one edge of a mouse pad (or other usable area) to an opposite edge, and moving the mouse across the area, to move the mouse cursor a long distance (e.g., across a large monitor when mouse sensitivity is set too low).

It should also be appreciated by those of skill in the art that one or more of the above steps may be optional, and also that the steps may be performed in other than the recited order, while still falling within the scope and spirit of the present invention. For example, step 629 is optional. When step 629 is not used, the system may simply eliminates $Z_A$ from $Z_{scroll}$ calculations. In embodiments where $G_f$ is not rounded up to 1.0 when $G_f$ would otherwise be lower than 1.0, step 631 may be omitted and step 633 might always be performed. As another example, when the process is used with a device that can sense touch (contact) from a user's hand, such as a touchpad, the process may skip steps relating $\Delta t$ and wheel events, and replace them with steps pertaining to 'Touch' and 'Release' events from the touch-sensitive device.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A computer-implemented method for accelerating scrolling, comprising the steps of:
    (i) receiving multiple input cycles from a motion-sensing wheel input device as a result of a user actuating the motion-sensing wheel input device above a threshold speed in a first direction, wherein each input cycle comprises a plurality of input events and each input event is a rotational increment of the wheel and wherein each cycle is determined based on the user pausing to reacquire the motion-sensing wheel input device; and
    (ii) for a plurality of cycles meeting predetermined criteria after the first cycle, incrementing a scrolling gain factor to cause a display device to scroll displayed content a greater predetermined distance per each of the plurality of input events than the input events of the immediately preceding cycle, wherein the predetermined criteria comprises each input cycle beginning within a predetermined amount of time after completion of the previous input cycle.

2. The method of claim 1, further comprising the step of:
    (iii) resetting the scrolling gain factor to a default value when input received from the motion-sensing wheel input device indicates the user is actuating the motion-sensing wheel input device in a direction substantially opposite to the first direction.

3. The method of claim 1, further comprising the steps of:
    (iii) detecting that the user has stopped actuating the motion-sensing wheel input device above the threshold speed; and
    (iv) in response to step (iii), resetting the scrolling gain factor to a default value.

4. The method of claim 1, further comprising the steps of:
    (iii) in response to receiving each input event, scrolling content a distance calculated as a function of the input event's speed.

5. A system for scrolling content displayed on a display screen, comprising:
    a motion-sensing user input device, the motion sensing input device comprising a wheel;
    a computer readable medium storing computer readable instructions that, when executed by a processor, cause a computer connected to a display device to perform the steps of:
    (i) receiving multiple input cycles from the motion-sensing input device as a result of a user actuating the motion-sensing input device above a threshold speed in a first direction, wherein each input cycle comprises a plurality of input events and each input event is a rotational increment of the wheel and wherein each cycle is determined based on the user pausing to reacquire the motion-sensing input device; and
    (ii) for a plurality of cycles meeting predetermined criteria after the first cycle, incrementing a scrolling gain factor to cause the display device to scroll displayed content a greater predetermined distance per each of the plurality of input events than the input events of the immediately preceding cycle, wherein the predetermined criteria comprises each input cycle beginning within a predetermined amount of time after completion of the previous input cycle.

6. The system of claim 5, wherein the computer readable instructions further comprise the step of:
    (iii) resetting the scrolling gain factor to a default value when input received from the motion-sensing input device indicates the user is actuating the motion-sensing input device in a direction substantially opposite to the first direction.

7. The system of claim 5, wherein the computer readable instructions further comprise the steps of:

(iii) detecting that the user has stopped actuating the motion-sensing input device above the threshold speed; and (iv) in response to step (iii), resetting the scrolling gain factor to a default value.

8. The system of claim 5, wherein the computer readable instructions further comprise the step of:

(iii) in response to receiving each input event, scrolling content a distance calculated as a function of the input event's speed.

9. An input device comprising:

a motion sensing mechanism;

memory storing firmware embodying instructions for performing acceleration, comprising the steps:

(i) receiving multiple input cycles comprising multiple input events from the motion-sensing mechanism as a result of a user actuating the motion-sensing mechanism above a threshold speed in a first direction and wherein each cycle is determined based on the user pausing to reacquire the motion-sensing mechanism; and (ii) for a plurality of cycles meeting predetermined criteria after the first cycle, incrementing a gain factor so that, responsive to each input event, the input device generates a larger predetermined scroll distance than each input event in an immediately preceding cycle, wherein the predetermined criteria comprises each input cycle beginning within a predetermined amount of time after completion of the previous input cycle.

10. The input device of claim 9, wherein the firmware further embodies the steps of:

(iii) detecting when the user stops actuating the motion-sensing mechanism above a threshold speed in a first direction; and (iv) responsive to step (iii), resetting the gain factor to a default value.

11. A method for scrolling content displayed on a display screen of a computer system, said method comprising:

(i) receiving a first scrolling input cycle from a motion-sensing input device as a result of a user actuating the motion-sensing input device above a threshold speed in a first direction, wherein the input cycle comprises a plurality of discrete input events; and (ii) for each discrete input event of the first input cycle, scrolling the content displayed on the display screen a default predetermined amount;

(iii) after a first brief pause, receiving a second scrolling input cycle from the motion-sensing input device as a result of the user actuating the motion-sensing input device above the threshold speed in the first direction without pausing for longer than a predetermined amount of time after the first scrolling input cycle;

(iv) for each discrete input event of the second cycle, scrolling the content displayed on the display screen a larger predetermined amount than the default predetermined amount scrolled per input event in the first cycle;

(v) after a second brief pause, receiving a third scrolling input cycle from the motion-sensing input device as a result of the user actuating the motion-sensing input device above the threshold speed in the first direction without pausing for longer than a predetermined amount of time after the second scrolling input cycle; and (vi) for each discrete input event of the third cycle, scrolling the content displayed on the display screen a larger predetermined amount than the predetermined amount scrolled per input event in the second cycle.

* * * * *